United States Patent Office 2,767,209
Patented Oct. 16, 1956

2,767,209

COMPLEXES OF DISSIMILAR METALS AND METHODS OF MAKING SAME

Peter A. Asseff, Cleveland, Thomas W. Mastin, Willoughby, and Alan Rhodes, Euclid, Ohio, assignors to The Lubrizol Corporation, Wickliffe, Ohio, a corporation of Ohio No Drawing. Application November 3, 1952, Serial No. 318,525

10 Claims. (Cl. 260—504)

This invention relates to new compositions of matter, and more particularly pertains to novel organic salt complexes and novel methods of producing same.

It is now well known that when preparing a salt or soap of an organic acid, the mere use of an excess of neutralizing agent, which in the prior art has been in the form of an oxide, hydroxide, carbonate, etc. of a desired metal, results in a product which contains an amount of metal in excess of that theoretically required to replace the acidic hydrogens of the organic acid used as a starting material.

An object of the present invention is to provide novel salt complexes. Another object of the present invention is to provide new methods of producing novel salt complexes. A further object of the present invention is to provide novel salt complexes which are especially adapted for use in lubricants. Other objects or advantages of this invention will be apparent from the following explanation and description thereof.

Essentially the present invention comprises novel salt complexes formed with an oil-soluble acidic organic compound and/or the salt thereof; a material which is hereinafter referred to as the promoter; salts or bases; and water.

More particularly, the present invention is concerned with salt complexes which are prepared by the method comprising:

I. Preparing and mixing a mass in which, at 50° C. at least 50% of the components are in the liquid state, and in which mass the active components consist of:
  (i) oil-soluble compounds selected from the class consisting of:
    (1) acidic organic compounds; and
    (2) salts of acidic organic compounds; and
    (3) mixtures of (1) and (2)
  (ii) compounds other than those selected as components (i) selected from the class consisting of:
    (1) compounds having the formula AH, in which A is an anionic radical and H is hydrogen, which compounds:
      (a) are water-soluble at a temperature of 50° C. to the extent of at least 0.0005%; and
      (b) in the presence of water, have an ionization constant greater than about $1 \times 10^{-10}$ at about 25° C. and the saturated aqueous solutions of which at about 25° C. have pH values no greater than 7.0;
    and which compounds are selected from the class consisting of:
      (a') organic compounds
      (b') inorganic compounds containing a plurality of atoms of an acid forming element;
    (2) the salts of the compounds defined by (1) above; the relative amounts of (i) and (ii) used being in the range of from about one equivalent of (i) to about ten equivalents of (ii) to about ten equivalents of (i) to about one equivalent of (ii);
  (iii) compounds other than those selected as components (i) and (ii) selected from the class consisting of:
    (1) salts; and
    (2) bases;
  in an amount such that there are present in the mass a total of substantially more than one equivalent of cationic salt-forming radicals, including those present in components (i) and (ii), per equivalent of (i) plus (ii); and
  (iv) materials selected from the class consisting of:
    (1) water;
    (2) the water-soluble alcohols and mixtures of such alcohols, and
    (3) mixtures of water and such alcohols
  in an amount, inclusive of that in chemical combination with all of the components present, equal to at least one mole per mole of (ii);

II. and then maintaining the mass at a temperature and for a period of time sufficient to drive off substantially any free water and alcohol, including water and alcohol of hydration, which may be present.

Optionally, the above salt complex can be further modified by:

III. Treating the mass with sufficient amounts of a material which in the presence of the mass will form a material having a higher ionization constant than AH, to liberate in the form of AH, a substantial portion of the radical A originally present in (ii).

If desired, the above salt complexes prepared in accordance with Step III can then undergo treatment to remove from the mass so much of AH as may have been formed by Step III.

As described above, the inorganic promoter is a compound "containing a plurality of atoms of an acid forming element." However, it should be understood for the purposes of this invention that the above description of the inorganic promoter includes those compounds containing a plurality of atoms of an element capable of forming acids either in combination with hydrogen alone or in combination with hydrogen and oxygen. Further, for the present invention those inorganic promoters which contain a non-metallic acid-forming element are preferred.

This application is a continuation-in-part of our copending application, Serial No. 216,101, filed March 16, 1951 and is a continuation-in-part also of our related copending applications, Serial No. 216,102 now U. S. Patent 2,617,049; Serial No. 216,103 now U. S. Patent 2,616,924; Serial No. 224,458 now U. S. Patent 2,695,910; Serial No. 263,961 now U. S. Patent 2,616,925; Serial No. 263,962 now U. S. Patent 2,616,911; Serial No. 263,963 now U. S. Patent 2,616,904; Serial No. 276,461 now abandoned; and Serial No. 276,462 now U. S. Patent 2,616,905.

In our aforesaid parent application Serial No. 216,101 there is disclosed the process of producing certain novel organic salt complexes and the novel products resulting from such processes. The present invention is an extension of the teaching of said parent case in that it has now been discovered that the processes disclosed in said parent application may be utilized in producing novel complexes which have unexpectedly good characteristics and which complexes are characterized by the inclusion therein of a plurality of different metals.

The utilization of a plurality of different metals leads to advantages not only in the production of products which have properties which cannot be achieved by the use of a single metal and also makes possible the production of complexes in certain respects like those produced by the process of said parent case at considerable savings and costs. The latter is especially true when the organic portion of the complex is derived from those organic sulphonic acids which are produced by processes which yield the sulphonic acid in the form of the sodium salt.

Examples of such processes of producing sulphonic acids and in which the latter is recovered in the form of its sodium salt are those processes now commonly employed for the production of mahogany sulphonic acids as well as the other sulphonic acids derived from mineral oil fractions including the process of treating a mineral oil fraction with chlorine and $SO_2$. Another class of sulphonic acids which are usually produced initially as the sodium salt are the alkylated aromatic sulphonic acids particularly the dodecyl benzene sulphonic acids.

In the prior art processes for producing polyvalent metal salts or polyvalent metal complexes of sulphonic acids which utilizes as a starting material the sodium salt as above defined, it has been common practice to begin with such sodium salt and then by the well-known process of double decomposition and by using a chloride of the desired metal, the sodium of such salt is replaced by the metal of said chloride. This procedure has generally been followed in the production of materials useful as detergents in lubricating oils since the salts containing only an alkali metal such as sodium, as the metal have not been found to be particularly effective, at least not nearly as effective as similar salts in which the metal is a polyvalent metal such as berium, for example.

In accordance with our present invention it has been found that when a normal salt such as a sulphonate of a metal which is not particularly effective as a lubricating oil detergent is complexed with another metal and particularly with a metal whose normal salts are outstandingly superior, a resultant complex is produced which has satisfactory properties while at the same time costing much less to produce. Thus, for example, it has been found that the normal sodium salt of any of the sulphonic acids mentioned above may be directly complexed with another basically reacting compound so as to eliminate not only the expensive double decomposition step, but at the same time utilizing as a part of the metal content of the final complex a metal which is less expensive than those which are found to give best results when used alone.

A mixture of different normal salts may be used as the starting material. These normal salts may differ both as to their anion and cation substituents. Thus, when utilizing the same anions and different cations, the end product will contain such different cations. In this connection it has been found that unexpectedly good results can be secured when using different anions when different cations are employed in the starting material, or more accurately in the formation of the normal salt component of the complex. With regard to the normal salts which may thus be employed in preparing the complexes of the present invention, it will be noted that they include the following: (a) a single starting acid neutralized with a single metal; (b) different portions of a single starting acid neutralized with different metals; (c) different starting acids neutralized with the same metal; and (d) different starting acids neutralized with different metals.

Similarly by the use of a plurality of different basically reacting materials which differ from each other as to the metal present, a plurality of different metals can be supplied to the ultimate complex. Here again it will be found that for certain combinations of different basically reacting materials one or more of those used may be in the form of the oxide, whereas at least one of those concurrently used may be in the form of the hydroxide.

With regard to the possible third source of metal i. e. as a substituent of the promoter it has been found that a plurality of different metals may be introduced through this reagent. Thus, for example, when using any promoter salt such as a phenate the entire mass of promoter may contain a plurality of different cations.

THE OIL SOLUBLE ACIDIC ORGANIC COMPOUNDS AND/OR THE SALTS THEREOF

The oil-soluble acidic organic compounds and/or the salts thereof employed for the purposes of the present invention include a variety of classes of compounds, such as the aliphatic or aromatic organic acids e. g., the sulfur acids, the carboxylic acids, acids of phosphorus, etc., or the salts of such acids, including the corresponding thio acids of any of the foregoing as well as mixtures of the same. The aromatic compounds include the mono- or polynuclear types of the benzenoid and heterocyclic classes; whereas the aliphatic compounds are for example the acyclic and cycloaliphatic compounds. It is intended that all such compounds be oil soluble for this invention, and in the preferred instance "oil solubility" is meant that the salt of the acidic organic compound will possess a solubility of at least about 10% in Pennsylvania conventionally refined mineral oil having a viscosity of about 150 SUS at 100° F., or what is commonly known as Pennsylvania 150 neutral oil.

Specific illustration of the types of oil-soluble acidic organic compounds or the salts thereof which can be employed in the process of this invention may be found in copending application, Serial No. 216,101 at page 10, line 22 through page 22, line 23.

It has been found that metal complexes of considerable utility may be produced when using as the starting material a mixture of at least two different sulfonic acid compounds.

Highly useful in this respect are mixtures containing (a) at least one petroleum derived sulfonic acid compound, and (b) at least one alkyl-aromatic sulfonic acid compound. Particularly preferred are mixtures of mahogany sulfonic acids or salts with alkyl-benzene sulfonic acids or salts. The ratio of equivalents of a/b is preferably between 0.1 and 10.

The following examples illustrate a number of specific combinations of different sulfonic acid compounds which may be used as starting materials for the production of our metal complexes. In each instance, the corresponding salts of the sulfonic acids are also contemplated.

| Mixture No. | Components | chemical equivalents |
|---|---|---|
| 1 | mahogany sulfonic acid | 1.0 |
|   | di-isododecyl benzene sulfonic acid | 1.0 |
| 2 | white oil sulfonic acid | 1.0 |
|   | mahogany sulfonic acid | 1.0 |
|   | di-isodocecyl benzene sulfonic acid | 2.0 |
| 3 | white oil sulfonic acid | 1.0 |
|   | di-isododecyl benzene sulfonic acid | 2.0 |
| 4 | mahogany sulfonic acid | 10.0 |
|   | wax-substituted phenol sulfonic acid | 1.0 |
| 5 | mahogany sulfonic acid | 5.0 |
|   | wax-substituted naphthalene sulfonic acid | 1.0 |
| 6 | mahogany sulfonic acid | 1.0 |
|   | wax-substituted benzene sulfonic acid | 9.0 |
| 7 | petrolatum sulfonic acid | 1.0 |
|   | white oil sulfonic acid | 2.0 |
| 8 | mahogany sulfonic acid | 1.0 |
|   | petrolatum sulfonic acid | 1.0 |
| 9 | mahogany sulfonic acid | 1.0 |
|   | white oil sulfonic acid | 1.0 |
| 10 | polybutene sulfonic acid | 1.0 |
|   | mahogany sulfonic acid | 5.0 |
| 11 | wax sulfonic acid | 1.0 |
|   | mahogany sulfonic acid | 2.0 |
| 12 | eicosyl diphenyl ether sulfonic acid | 1.0 |
|   | mahogany sulfonic acid | 7.0 |
| 13 | tri-capryl diphenyl ether sulfonic acid | 1.0 |
|   | mahogany sulfonic acid | 2.5 |
| 14 | bis-(diisobutyl)-phenol sulfonic acid | 1.0 |
|   | white oil sulfonic acid | 3.0 |
| 15 | cetyl-chlorobenzene sulfonic acid | 1.0 |
|   | mahogany sulfonic acid | 8.0 |
| 16 | di-cetyl naphthalene sulfonic acid | 10.0 |
|   | mahogany sulfonic acid | 1.0 |
| 17 | mahogany sulfonic acid | 2.0 |
|   | white oil sulfonic acid | 1.0 |
|   | di-lauryl diphenyl ether sulfonic acid | 1.0 |
|   | di-isononyl benzene sulfonic acid | 1.0 |
| 18 | white oil disulfonic acid | 1.0 |
|   | di-isooctadecyl benzene sulfonic acid | 2.0 |

| Mixture No. | Components | chemical equivalents |
|---|---|---|
| 19 | petroleum naphthene sulfonic acids / mahogany sulfonic acid / polybutene-substituted benzene sulfonic acid | 1.0 / 1.0 / 1.0 |
| 20 | di-keryl benzene sulfonic acid / mahogany sulfonic acid | 2.0 / 1.0 |
| 21 | fuel oil substituted benzene sulfonic acid / mahogany sulfonic acid | 1.5 / 1.0 |
| 22 | stearyl naphthalene sulfonic acid / white oil sulfonic acid | 3.0 / 1.0 |
| 23 | wax-substituted phenothioxine sulfonic acid / mahogany sulfonic acid | 1.0 / 3.5 |

THE PROMOTER

The compound employed for the purposes hereunder can be represented by the formula AH, in which A is an anionic radical and H is hydrogen and/or the salt thereof. The compounds AH have a water solubility at a temperature of 50° C. to the extent of at least about 0.0005% and will, in the presence of water at about 25° C., have an ionization constant greater than about $1 \times 10^{-10}$ as well as have a pH value not greater than 7 at about 25° C. when employed in saturated aqueous solutions.

The promoter AH can be organic or inorganic. In the case of the inorganic promoter it is intended to include only those which contain a plurality of atoms of an acid-forming element which are capable of forming acids either in combination with hydrogen alone or in combination with hydrogen and oxygen. It is preferred to use those promoters in which the acid-forming element is non-metallic.

With respect to the organic promoter AH, a particular subclass thereof includes the compounds AXH in which A and H are defined as given above, and X is either oxygen or sulfur. More particularly, as for the organic promoters, it is preferred to employ the salts of compounds AH which have oil solubility of less than 10% in a conventionally refined solvent extracted Pennsylvania oil having a 150 SUS @ 100° F., commonly referred to as Pennsylvania 150 neutral oil.

Classes of promoters and specific examples thereof which may be used for the purposes of this invention are disclosed in copending application, Serial No. 216,101 at page 23, line 18 through page 38, line 21.

SALTS AND BASES (THE BASING MATERIAL)

The salt or base employed furnishes the cationic salt-forming radical to the desired salt complex. These salts or bases should preferably have a water solubility of at least about 0.0003% to 50° C., and still more preferred are "basic" compounds, i. e., those compounds which give an alkaline reaction or pH value greater than 7 in aqueous solutions.

Specific examples of metal cations and anions which may be combined to form the salts and bases (basing materials) of this invention, as well as specific examples of such salts and bases are disclosed in copending application, Serial No. 216,101 at page 39, line 1 through page 47, line 29.

The formation of the salt complex is accomplished with water or an alcohol or mixtures of both. The water is present as a result of addition to the mixture, or is liberated from compounds incorporated into the mixture as a result of being subjected to processing temperatures. It is preferred to employ water which is added to the mixture.

The alcohol employed can be either monohydric or polyhydric, and should preferably be at least about 5% water soluble @ 15° C. Examples of monohydric alcohols are methanol, ethanol, propanol-1, propanol-2, butanol-1, butanol-2, isobutyl alcohol, t-butyl alcohol, pentanol-3, etc.; and examples of polyhydric alcohols are ethylene glycol, propylene glycol, butylene glycol, amlylene glycol, hexylene glycol, pentaerythritol, etc.

Water and alcohol can be used together in effecting the formation of the salt complex. Ordinarily mixtures of the same in any relative proportion are useful, however it is preferred to employ mixtures containing at least 60% water.

THE ACIDIC MATERIAL

As previously indicated, one form of the process of the present invention includes the step of treating the immediate product with an acidic material for the purpose of liberating therefrom at least a portion of the material previously referred to as the promoter. A particularly effective acidic material which has been utilized for this purpose is carbon dioxide. We are aware of the fact that Mertes in his Patent No. 2,501,731 suggested transforming a sodium hydroxide-calcium sulphonate complex into the sodium carbonate-calcium sulphonate complex or the corresponding bicarbonate complex by blowing the hydroxide complex with carbon dioxide at elevated temperatures.

In our process, the step of treating with an acidic material such as carbon dioxide or even with air has the effect of liberating from the immediate product formed a part at least of the anionic radical of the compound used as the promoter material. Thus the presence in the immediate product of the promoter material, in combined form, clearly distinguishes the immediate product from any organic salt complex type material heretofore produced. Moreover, the nature of the product formed by regenerating from the immediate product at least a portion of the anionic radical of the promoter material leaves that product with a composition which is quite different from prior art organic complexes. It is recognized that in accordance with the present invention, the salt form of promoter can be employed in forming the salt complex. However, notwithstanding this fact, upon treating the salt complex with the acidic material to be more particularly defined below, this salt compound is released or liberated from association in the salt complex as the ionizable compound and not the salt.

The acidic material employed for this purpose can be either a liquid, gas, or solid just so long as the material when present in the mass containing the salt complex will possess an ionization constant greater than the promoter which is released or liberated from association in the salt complex. Thus, for the purpose of this specification and the appended claims, it is to be undertood that the acidic material includes a liquid, gas, or solid prior to being incorporated in the mass which contains the salt complex.

In the present invention, the acidic material usually employed is an acid or a gas. The acids can include the strong or weak types, such as, for example, hydrochloric, sulphuric, nitric, carbonic, acetic acids, etc., whereas the gas is for the most part an anhydride or an acid or an "acid anhydride gas."

The large number and variety of acidic materials can be best illustrated by the following specific examples, viz. HCl, $SO_2$, $SO_3$, $CO_2$, air, $NO_2$, $H_2S$, $N_2O_3$, $PCl_3$, $SOCl_2$, $ClO_2$, $H_2Se$, $BF_3$, $CS_2$, COS, etc.

From the above examples of compounds and classes of compounds which can be used as acidic materials, it should be understood that all of them are not equivalent for this invention because under certain conditions some are more desirable or effective than others.

Generally, the complex formed is prepared by heating the components, at a superatmospheric temperature while insuring thorough mixing and then further heating said mixture to substantially remove all free water or alcohol, including water and alcohol of hydration which may be present. The following methods illustrate the manner by which the complex can be formed, namely: (a) The compound AH or the salt thereof, is added to the oil-soluble salt of an acidic organic compound, followed by addition of an aqueous solution or suspension the salt or base thereto. The mixture is held at a superatmospheric temperature for a reasonable length of time while insuring thorough mixing, and then the total mixture is further heated to substantially remove all free water or alcohol including water or alcohol of hydration which may be present. (b) The salt or base in a dry state is added to a mixture of oil-soluble acidic organic compound or salt thereof, the compound AH or the salt thereof and either water, alcohol, or mixtures of alcohols or water and alcohol; heated to a superatmospheric temperature while insuring thorough mixing and then further heated to remove substantially all free water or alcohol including water or alcohol of hydration which may be present; (c) The acidic organic compound is mixed with the compound AH or the salt thereof, then an aqueous solution or suspension or an alcoholic solution or suspension of the salt or base is added thereto. The mixture is heated and agitated at a superatmospheric temperature for a time sufficient to insure thorough mixing and followed by subjecting the total mixture to dehydration conditions in order to remove substantially all free water or alcohol including water or alcohol of hydration which may be present. (d) A mixture of the oil-soluble acidic organic compound or the salt thereof, the compound AH or the salt thereof, and the salt or base is heated and agitated at a superatmospheric temperature for a time sufficient to insure thorough mixing, and followed by heating the total mixture in order to remove substantially all free water or water of hydration which may be present; (e) The sediment when formed from any of the aforementioned methods can be employed either alone or with an additional amount of compound AH or the salt thereof in any of the three methods given above; (f) In any of the methods discussed herein for preparing a salt complex, a substantial increase in cationic salt-forming radical content is effected by treating the mass with an acidic material just after substantial amounts of water or alcohol or both, are driven off and just before the mass is filtered.

In all of the methods described above for preparing the salt complex, the step of removing substantially all free water or alcohol including water or alcohol of hydration which may be present is accomplished at a temperature not substantially in excess of 350° C., preferably about 110° to 200° C. The technique employed to remove the alcohol or water includes, for example, a conventional flash operation, heating under subatmospheric, atmospheric, or superatmospheric pressures. It can, therefore, be seen that the temperature as well as the time for effecting the substantial removal of the alcohol or water will generally vary considerably depend on the technique employed therefor. Generally, the time required to effect substantial removal of water or alcohol when employing drying other than flash techniques is about 15 minutes or less, and can be as high as 10–15 hours. Usually, however, atmospheric pressures will be employed for such an operation, and consequently it will usually require about 1 to 5 hours to remove substantially all water or alcohol which may be persent. At a later stage of the process, the acidic material when used in gaseous form may be used to remove the last portion of water.

For the purposes of this specification and the appended claims, the relative amounts of (1) the oil-soluble acidic organic compounds or salts thereof, and (2) the promoter is expressed as the "ratio of equivalents" of the former (1) to the latter (2). In accordance therewith, the ratio of equivalents is from about 1 to 10 to about 10 to 1, preferably from about 3 to 2 to about 7 to 2. The amount of salt or base employed in the process will be sufficient to have present in the total mass at least more than about one euqivalent of cationic salt-forming radicals including those present in the oil-soluble acidic organic compound or the salt thereof and the promoter per equivalent of oil-soluble acidic organic compound or salt thereof plus the promoter.

The treatment of the salt complex with an acidic material is employed when it is desirable to lower the basic number of the salt complex and/or partially or substantially recover the promoter. This treatment is effected at a temperature of about 25° to 250° C., preferably about 120° to 170° C., and by employing about 0.5 to 20% of acidic material based on the weight of salt complex. The time of treatment with the acidic material can vary considerably depending on the desired result. As would be expected, short periods of treatment might cause only partial liberation or release of the promoter or relatively small decreases in the basic number of the salt complex; however, in general, periods of treatment will range from about 0.25 to 30 hours. In most cases, and particularly where it is desired to recover the promoter, the amount of acidic material used should be at least equivalent to the amount of cationic salt forming radicals present as the salt of the ionizable form of promoter. When it is desired to produce a product having substantially neutral reaction, the amount of acidic material used should be at least equivalent to the total cationic salt forming radicals in excess of that present as the normal salt of the oil soluble organic acid.

In those instances where salts or bases containing metal are employed as the basing agent the metal content of the complex will be defined as the ratio of the total metal in the salt complex to the amount of metal which is in the form of a normal salt of the oil-soluble acidic organic compound. In accordance therewith the present invention includes salt complexes containing metal ratios greater than 1, and up to about 10 or more. As for those complexes which are treated with an acidic material it is to be noted that the metal ratio is substantially the same as in the complex prior to treating. Consequently, for acidic material treated complexes, the same metal ratios will apply as given above. Likewise, when the salt complex is treated with an acidic material and the promotor is removed from the resultant product by distillation or otherwise, it is found that the metal ratio will be substantially the same as in the salt complex before treating with the acidic material.

It has been found that the salt complex can be prepared by using small quantities of water, alcohol, or mixtures of both, such as about 1 mole of same per mole of salt or base which is employed as the basing agent. However, more usually about 5 to 50 moles of water, alcohol or mixtures of both per mole of salt or base used, and preferably about 15 to 30 moles per mole.

To substantially increase the metal content of the salt complex, the total mass is treated with an acidic material just prior to filtering same to separate the desired salt complex. This treatment is effected at a temperature of about 25° to 250° C. preferably about 120° to 170° C., using about 0.5 to 20% of acidic material, based on the total mass, and for a period of about 0.25 to 30 hours. Treatment with an acid anhydride gas may be accelerated by superatmospheric pressure.

In order to better understood the present invention, the following specific examples thereof are given; however it should be understood that no undue limitations or restrictions should be imposed by reason thereof.

The following examples give the preparation of a plurality of products which range in cationic salt forming radical content from about that of the normal salt up to many times that amount.

We have found that sulphate ash and/or metal content values, and the metal ratio values calculated therefrom, are one of the most reliable means for characterizing certain of the salt complexes. As the description of the invention proceeds, it will become apparent that the neutralization number of a salt complex is in certain instances an unreliable index of the amount of excess cationic salt forming radicals in such complex, since it is greatly affected by the type of basing agent employed and can be varied within wide limits without significantly changing the cationic salt forming radical content of the product by treatment of the mass with air, $CO_2$, or the like.

The above is not to be construed as a statement that the neutralization number is not an important property of a salt complex. For some uses, for example in lubricants, it is advantageous in certain instances to employ a salt complex of a substantially neutral character, whereas in other instances a salt complex of high alkalinity has been found to produce the desired results.

The following example illustrates an attempt to incorporate a stoichiometric excess of alkaline earth metal in an oil-soluble alkali metal sulfonate without the use of a promoter.

*Example 1*

To a mixture of 1330 grams (2.0 equivalents) of a 60% oil solution of sodium petroleum sulfonate, 1048 grams of mineral oil, and 250 grams of water there was added at 70° C. 217 grams (2.84 equivalents) of barium oxide, and the mixture was heated at reflux temperature for two hours. The water was removed in a period of five hours by heating to 150° C. and holding at this temperature. The mixture was filtered through a siliceous filter aid. The filtrate showed the following analyses:

Basic No. _____ 15.5
Barium _____percent__ 2.3
Sodium _____do___ 2.7
Metal ratio_____ 1.4

The above analyses clearly show the essentiality of a promoter in the preparation of the high metal-containing compositions of this invention.

The above procedure, utilizing 505 grams (0.75 equivalents) of 60% oil solution of sodium petroleum sulfonate, 93 grams (0.45 equivalents) of diisobutyl phenol (promoter), 353 grams of mineral oil, 150 grams of water, and 227 grams (2.97 equivalents) of barium oxide yielded an oil-soluble, free-flowing liquid product which showed the following analyses:

Basic No. _____ 62.1
Barium _____percent___ 8.45
Sodium _____do___ 1.66
Metal ratio_____ 2.99

*Example 2*

A mixture of 1285 grams (1.0 equivalent) of a 40% oil solution of barium petroleum sulfonate (having a sulfate ash content of 10.0%), 124 grams (0.6 equivalent) of diisobutyl phenol, 163 grams (3.9 equivalents) of lithium hydroxide monohydrate and 200 grams of water was heated at 100° C. for one hour, then the temperature was raised slowly to 150° C. and maintained there for an additional hour. The mixture was treated with a stream of carbon dioxide at this temperature for one hour, dried at 150° C. for 30 minutes and filtered through a siliceous filter aid. The oil-soluble, free-flowing filtrate was found to have the following analyses:

Basic No. _____ 3.6
Barium _____percent__ 4.28
Lithium _____do___ 1.47
Metal ratio_____ 4.16

*Example 3*

A mixture of 630 grams (1.0 equivalent) of petroleum sulfonic acid, 400 grams of mineral oil, 250 grams of water, and 54 grams (1.28 equivalents) of lithium hydroxide was heated at reflux temperature for one hour. The mixture was cooled to 70° C., treated with 124 grams (0.6 equivalent) of diisobutyl phenol and 302 grams (3.94 equivalents) of barium oxide, and heated at reflux temperature for one hour. The resultant reaction mass then was dried by raising the temperature to 150° C. and treated with a stream of carbon dioxide for an hour. This carbonated product was dried further for 30 minutes at 150° C. and filtered through a siliceous filter aid. The oil-soluble, free-flowing filtrate was shown to have the following analyses:

Basic No. _____ 10.8
Barium _____percent__ 16.7
Lithium _____do___ 0.38
Metal ratio_____ 4.56

*Example 4*

The potassium salt of a phosphorus- and sulfur-containing acid was prepared by treating a polybutene with phosphorus pentasulfide and sulfur and subsequently treating with steam. A mixture of 1080 grams (1.0 equivalent) of this salt, 205 grams of mineral oil, 124 grams (0.6 equivalent) of diisobutyl phenol, 480 grams of water, and 302 grams (3.94 equivalents) of barium oxide was heated at reflux temperature for one hour, then freed of water by heating to 150° C. and maintaining this temperature for one hour. A stream of carbon dioxide was bubbled into the mixture for an hour and this temperature was maintained for an additional 30 minutes. The mixture was filtered through a siliceous filter aid, yielding an oil-soluble, free-flowing filtrate which was shown to have the following analyses:

Basic No. _____ 1.18
Barium _____percent__ 12.9
Potassium _____do___ 2.2
Metal ratio_____ 4.35

*Example 5*

A mixture of 1080 grams (1.0 equivalent) of the potassium salt of the phosphorus- and sulfur-containing product prepared as in the preceding example, 1285 grams (1.0 equivalent) of a 10.0% oil solution of barium petroleum sulfonate, 248 grams (1.2 equivalents) of diisobutyl phenol, 598 grams (7.8 equivalents) of barium oxide, 500 grams of water, and 400 grams of mineral oil was heated at reflux temperature for one hour, then freed of water by heating to 150° C. and maintaining this temperature for one hour. The mixture was treated at this temperature for 2.5 hours with carbon dioxide, then heated at 150–160° C. for an additional 30 minutes. The carbon dioxide-treated mass was filtered through a siliceous filter aid, the oil-soluble, free-flowing filtrate having the following analyses:

Basic No. _____ 6.8
Barium _____percent__ 14.7
Potassium _____do___ 1.01
Metal ratio_____ 4.53

*Example 6*

A mixture of 998 grams (1.5 equivalents) of a 60% oil solution of sodium petroleum sulfonate, 186 grams (0.9 equivalents) of diisobutyl phenol, 717 grams of mineral oil, 300 grams of water, and 453 grams of barium oxide was heated at reflux temperature for one hour then freed of water by heating to 150° C. and holding at that temperature for another hour. Carbon dioxide was bubbled into the mixture at this temperature for two hours and heating was continued at 150–160° C. for an additional 30 minutes. The mixture was filtered through a siliceous filter aid, yielding an oil-soluble, free-flowing filtrate which was found to have the following analyses:

Basic No. _____ 9.0
Barium _____percent__ 16.0
Sodium _____do___ 1.42
Metal ratio_____ 4.75

*Example 7*

A mixture of 500 grams (0.42 equivalent) of the potassium salt of the phosphorus- and sulfur-containing acid prepared as in Example 4, 470 grams (0.42 equivalent) of a 40% oil solution of barium petroleum sulfonate (having 10.0% sulfate ash), 100 grams of water, and 105 grams (0.51 equivalent) of diisobutyl phenol was treated at 70° C. with 288 grams (3.76 equivalents) of barium oxide, then heated at reflux temperature for one hour. The water was removed by heating to 150° C. and holding the mixture at that temperature for one hour. Carbon dioxide was bubbled into the mixture for one hour and the temperature was maintained at 150–155° C. for an additional 30 minutes. The mixture was filtered through a siliceous filter aid yielding as a filtrate an oil-soluble, free-flowing liquid having the following analyses:

| | |
|---|---|
| Basic No | 12.2 |
| Barium percent | 18.4 |
| Potassium do | 1.1 |
| Metal ratio | 5.1 |

Example 8

A mixture of 500 grams (0.42 equivalent) of the potassium salt of the phosphorus- and sulfur-bearing acid prepared as described in Example 5, 470 grams (0.42 equivalent) of a 40% oil solution of barium petroleum sulfonate (having a sulfate ash content of 10.0%), 105 grams (0.51 equivalent) of diisobutyl phenol, and 100 grams of water was treated at 70° C. with 288 grams (3.76 equivalents) of barium oxide, then heated at reflux temperature for an hour. The water was removed by heating to 150° C. This temperature was maintained for one hour prior to bubbling carbon dioxide into the mixture for one hour, and for 30 minutes thereafter. The product was filtered through a siliceous filter aid. The oil-soluble, free-flowing filtrate had the following analyses:

| | |
|---|---|
| Basic No | 14.1 |
| Barium percent | 16.7 |
| Potassium do | 1.1 |
| Metal ratio | 4.5 |

Example 9

A mixture of 845 grams (1.0 equivalent) of lithium didodecyl benzene sulfonate, 53.5 grams (0.6 equivalent) of nitropropane, 302 grams (3.94 equivalents) of barium oxide, 629 grams of mineral oil, and 190 grams of water was heated at 100° C. for one hour, then the temperature was raised slowly to 150° C. and maintained there for an additional hour. The mixture was treated with a stream of carbon dioxide at this temperature for one hour, dried at 150–160° C. for 30 minutes, and filtered through a siliceous filter aid. The oil-soluble, free-flowing filtrate was found to have the following analyses:

| | |
|---|---|
| Basic No | 0.42 |
| Barium percent | 13.7 |
| Lithium do | 0.24 |
| Metal ratio | 4.4 |

Example 10

A mixture of 572 grams (1.0 equivalent) of sodium dieicosylnaphthalene sulfonate, 124 grams (0.6 equivalent) of diisobutyl phenol, 302 grams (3.94 equivalents) of barium oxide, 835 grams of mineral oil, and 230 grams of water was heated at reflux temperature for one hour, then the temperature was raised to 150° C. and so maintained for another hour. The mixture was treated with carbon dioxide at this temperature for one hour, heated for another 30 minutes, then filtered through a siliceous filter aid. The oil-soluble, free-flowing filtrate was found to have the following analyses:

| | |
|---|---|
| Basic No | 6.6 |
| Barium percent | 9.85 |
| Sodium do | 1.26 |
| Metal ratio | 4.4 |

Example 11

A mixture of 630 grams (1.0 equivalent) of petroleum sulfonic acid, 878 grams of mineral oil, 310 grams of water, and 42 grams (1.0 equivalent) of lithium hydroxide monohydrate was heated at reflux temperature for one hour. The lithium salt mixture was cooled to 70° C. and 36 grams (0.6 equivalents) of acetic acid and 302 grams (3.94 equivalents) of barium oxide were added. This mixture was heated at reflux temperature for one hour, then to 150° C., at which point carbon dioxide was bubbled into the mixture for an hour. Heating was continued for an additional 30 minutes, then the mixture was filtered through a filter aid, yielding a slightly viscous, oil-soluble filtrate having the following properties:

| | |
|---|---|
| Basic No. | nil |
| Barium percent | 10.6 |
| Lithium do | 0.18 |
| Metal ratio | 3.4 |

Example 12

A mixture of 500 grams (0.79 equivalent) of petroleum sulfonic acid, 561 grams of mineral oil, 120 grams of water, and 35 grams (0.79 equivalent) of lithium hydroxide monohydrate was heated at reflux temperature for one hour. The lithium salt mixture was cooled to 70° C. and 159.5 grams (0.48 equivalent) of di-n-hexyl dithiophosphoric acid and 240 grams (3.13 equivalents) of barium oxide were added. The resulting mixture was heated for one hour at reflux temperature, then to 155° C. and treated for one hour with carbon dioxide. Thereafter, the temperature of 150–160° C. was maintained for another hour and then the mixture was filtered through a siliceous filter aid, the filtrate being an oil-soluble, slightly viscous liquid having the following analyses:

| | |
|---|---|
| Basic No. | 53.8 |
| Barium percent | 14.7 |
| Lithium do | 0.11 |
| Metal ratio | 4.34 |

Example 13

Lithium petroleum sulfonate was prepared as in the preceding example and then treated at 70° C. with 230 grams (2.44 equivalents) of phenol and 46 grams (1.22 equivalents) of calcium hydroxide. This mixture was heated at reflux temperature for one hour, then to 150° C. and treated for one hour with carbon dioxide. Heating was continued for an additional hour, then the mixture was filtered through a siliceous filter aid, the filtrate being oil-soluble and only slightly viscous, and having the following analyses:

| | |
|---|---|
| Basic No. | 29.2 |
| Calcium percent | 4.32 |
| Lithium do | 0.65 |
| Metal ratio | 5.14 |

Example 14

A mixture of 448 grams (1.66 equivalents) of sodium naphthenate, 223 grams (1.0 equivalent) of nonylphenol, 1620 grams of mineral oil, and 500 grams of water was treated at 50° C. with 500 grams (3.27 equivalents) of barium oxide. This mixture then was heated at reflux temperature for one hour, and then was heated to 150° C.[1] and treated with carbon dioxide for 90 minutes. The mixture was kept at 150–165° C. for an additional 30 minutes, then filtered through a siliceous filter aid. The filtrate was an oil-soluble, free-flowing liquid having the following analyses:

| | |
|---|---|
| Basic No. | 0.94 |
| Barium percent | 8.9 |
| Sodium do | 1.15 |
| Metal ratio | 4.0 |

[1] Approximately 800 grams of this material was heated an additional one hour at 150° C., then filtered through a siliceous filter aid, yielding an oil-soluble, free-flowing filtrate having the following analyses:

| | |
|---|---|
| Basic No. | 35.3 |
| Sodium percent | 0.37 |
| Barium do | 8.7 |
| Metal ratio | 2.4 |

Example 15

To a mixture of 630 grams (1.0 equivalent) of petroleum sulfonic acid, 824 grams of mineral oil, 66 grams (1.0 equivalent) of potassium hydroxide and 135 grams of water there was added at 50–60° C. 124 grams (0.6 equivalent) of tetralin sulfonic acid and 203 grams (3.93 equivalents) of strontium oxide. This mixture was heated at reflux temperature for an hour, then dried by heating to 150° C. A sample was removed and filtered, the filtrate showing the following analyses:

| | |
|---|---|
| Basic No. | 0.28 |
| Potassium _____percent__ | 2.2 |
| Strontium _____do____ | 2.76 |
| Metal ratio | 2.32 |

The unfiltered product was treated further at 150–160° C. with carbon dioxide for an hour, then filtered. The filtrate showed the following analyses:

| | |
|---|---|
| Basic No. | nil |
| Potassium _____percent__ | 2.4 |
| Strontium _____do____ | 2.67 |
| Metal ratio | 2.32 |

Example 16

The strontium salt (1160 grams—1.0 equivalent) of white oil sulfonic acid was prepared by adding chlorosulfonated white oil to aqueous sodium hydroxide at 80–95° C. and treating the resulting sodium sulfonate with strontium chloride at 90° C. The aqueous layer was removed and 1464 grams of mineral oil was added to the residue. The washed oil layer, strontium white oil sulfonate, was treated with 318 grams (1.0 equivalent) of cetyl phenol and 275 grams (6.54 equivalents) of lithium hydroxide monohydrate, and heated at reflux temperature for an hour, then heated up to 150° C. A sample of this material was dried further by heating at 150° C. for one hour. Filtration of this material yielded an oil-soluble liquid which showed the following:

| | |
|---|---|
| Basic No. | 8.9 |
| Lithium _____percent__ | 0.37 |
| Strontium _____do____ | 1.27 |
| Metal ratio | 1.64 |

The remaining unfiltered product was treated with carbon dioxide for 90 minutes at 150° C., then filtered. The filtrate was an oil-soluble, free-flowing liquid having the following analyses:

| | |
|---|---|
| Basic No. | nil |
| Lithium _____percent__ | 0.61 |
| Strontium _____do____ | 1.27 |
| Metal ratio | 2.2 |

Example 17

A phosphorus- and sulfur-containing acid was prepared by treating a polyisobutylene with thiophosphoryl chloride, and then with steam. To a mixture of 1074 grams (1.5 equivalents) of this acid and 992 grams of mineral oil there was added portionwise 60 grams (1.5 equivalents) of sodium hydroxide dissolved in 400 grams of water, and the salt mixture heated for one hour at 50–70° C. To this was added 186 grams (0.9 equivalent) of diisobutyl phenol, and then at 50–95° C. 451 grams (5.9 equivalents) of barium oxide. This mixture was heated at reflux temperature for one hour, then dried by heating up to 150° C. Approximately one third of this was dried further by continued heating for an hour at 150° C. Filtration of this sample yielded an oil-soluble, non-viscous filtrate having the following analyses:

| | |
|---|---|
| Basic No | 17.9 |
| Sodium _____percent__ | 0.62 |
| Barium _____do____ | 11.05 |
| Metal ratio | 4.0 |

The unfiltered product was treated with carbon dioxide at 150° C. for 90 minutes, dried by heating for an additional hour at 150° C., then filtered. The filtrate was oil-soluble, slightly viscous, and had the following analyses:

| | |
|---|---|
| Basic No | 0.6 |
| Sodium _____percent__ | 1.2 |
| Barium _____do____ | 12.1 |
| Metal ratio | 4.4 |

Example 18

To a mixture of 1220 grams (1.0 equivalent) of dieicosyl salicylic acid, 90 grams (0.6 equivalent) of p-tert-butyl phenol, and 214 grams of water there was added at 50° C. 42 grams (1.0 equivalent) of lithium hydroxide monohydrate. This mixture was heated at 50° C. for 15 minutes, then treated with 301 grams (3.94 equivalents) of barium oxide and heated at reflux temperature for one hour. The temperature was raised to 150° C. and a portion [2] of the product was removed and dried at 150–160° C. for one hour, then filtered through a siliceous filter aid. This sample was found to have the following analyses:

| | |
|---|---|
| Basic No | 63.4 |
| Lithium _____percent__ | 0.22 |
| Barium _____do____ | 12.7 |
| Metal ratio | 3.9 |

Example 19

A mixture of 665 grams (1.0 equivalent) of a 60% oil solution of sodium petroleum sulfonate, 20.6 grams (0.1 equivalent) of diisobutyl phenol (ratio of equivalents of sulfonate to phenol is 10.0), 395 grams of mineral oil and 132 grams of water was treated at 50° C. with 183 grams (2.39 equivalents) of barium oxide, then heated at reflux temperature for one hour. The resulting product was dried by heating to 150° C. A sample [3] was withdrawn and dried further at 150° C. for one hour, then filtered. It was shown to have the following analyses:

| | |
|---|---|
| Basic No | 20.5 |
| Sodium _____percent__ | 2.1 |
| Barium _____do____ | 8.3 |
| Metal ratio | 2.5 |

Example 20

To a mixture of 133 grams (0.2 equivalent) of a 60% oil solution of sodium petroleum sulfonate, 412 grams (2.0 equivalents) of diisobutyl phenol (ratio of equivalents of sulfonate to phenol is 0.1), 1432 grams of mineral oil, and 263 grams of water, there was added at 40° C. 503 grams (6.58 equivalents) of barium oxide and the resulting mixture was heated at reflux temperature for one hour, then dried by heating at 150–160° C. for one hour. This material was filtered and the filtrate shown to have the following analyses:

| | |
|---|---|
| Basic No | 47.5 |
| Sodium _____percent__ | 0.29 |
| Barium _____do____ | 6.4 |
| Metal ratio | 1.9 |

[2] The remaining material was treated with carbon dioxide, then dried as above and filtered. This material showed the following analyses:

| | |
|---|---|
| Basic No. | 17.9 |
| Lithium _____percent__ | 0.22 |
| Barium _____do____ | 12.7 |
| Metal ratio | 4.2 |

[3] The remainder was treated at 150° C. with carbon dioxide for one hour and heated at 150–160° C. for an additional hour. This material had the following analyses:

| | |
|---|---|
| Basic No. | 5.93 |
| Sodium _____percent__ | 1.85 |
| Barium _____do____ | 9.5 |
| Metal ratio | 3.0 |

The thus-dried material was further treated with carbon dioxide for one hour at 150–160° C., dried at this temperature for an additional hour, and filtered through a siliceous filter aid. The filtrate had the following analyses:

| | |
|---|---|
| Basic No | 10.8 |
| Sodium _____percent__ | 0.25 |
| Barium _____do____ | 15.4 |
| Metal ratio | 4.6 |

*Example 21*

A mixture of 332 grams (0.5 equivalent) of a 60 percent oil solution of sodium petroleum sulfonate, 315 grams (0.5 equivalent) of petroleum sulfonic acid, 753 grams of mineral oil, and 135 grams of water was treated at 35–40° C. with 21 grams (0.5 equivalent) of lithium hydroxide monohydrate. The temperature was raised to 80° C. and 124 grams (0.6 equivalent) of diisobutyl phenol was added; then at 87–92° C. 301 grams (3.93 equivalents) of barium oxide was added portionwise over a period of 25 minutes. The resulting mixture was heated at reflux temperature for one hour, then dehydrated by heating to 150° C. A sample was removed, dried further by heating at 150–160° C. for an hour, then filtered through a siliceous filter aid. The filtrate was a dark, oil-soluble, viscous liquid, having the following analyses:

| | |
|---|---|
| Basic No | 64 |
| Sodium _____percent__ | 0.53 |
| Lithium _____do____ | 0.127 |
| Barium _____do____ | 11.3 |
| Metal ratio | 3.84 |

The unfiltered portion of the product was treated further at 145–155° C. for one hour with carbon dioxide. A 30-minute period of heating at 150–155° C. followed and the product was filtered through a siliceous filter aid. The filtrate was an oil-soluble, free-flowing liquid having the following analyses:

| | |
|---|---|
| Basic No | 3.3 |
| Sodium _____percent__ | 0.15 |
| Lithium _____do____ | 0.56 |
| Barium _____do____ | 13.2 |
| Metal ratio | 4.6 |

*Example 22*

To a mixture of 315 grams (0.5 equivalent) of petroleum sulfonic acid and 365 grams of mineral oil there was added a solution of 28 grams (0.5 equivalent) of potassium hydroxide in 67 grams of water. The temperature was increased to 70° C., whereupon 45 grams (0.3 equivalent) of p-tert-butyl phenol and 151 grams (1.96 equivalents) of barium oxide were added. The mixture was heated at reflux temperature for one hour, then to 150° C. A sample was withdrawn and dried by heating at 150–160° C. for an additional hour, then filtered through a filter aid. The oil-soluble, slightly viscous filtrate showed the following analyses:

| | |
|---|---|
| Basic No | 5.8 |
| Potassium _____percent__ | 2.53 |
| Barium _____do____ | 1.32 |
| Metal ratio | 1.60 |

The unfiltered portion of the product was treated with carbon dioxide for an hour at 150–155° C., then heated at this temperature for an additional hour. The product was filtered through a filter aid yielding an oil-soluble, free-flowing liquid having the following analyses:

| | |
|---|---|
| Basic No | 1.3 |
| Potassium _____percent__ | 1.89 |
| Barium _____do____ | 13.4 |
| Metal ratio | 4.67 |

*Example 23*

A mixture of 332 grams (0.5 equivalent) of a 60 percent oil solution of sodium petroleum sulfonate, 45 grams (0.3 equivalent) of p-tert-butyl phenol and 633 grams of oil was treated at 70° C. with 260 grams (1.96 equivalents) of strontium hydroxide octahydrate, added portionwise over a period of 20 minutes. This mixture was heated at reflux temperature for an hour, then freed of water by heating to 150° C. A sample was withdrawn, dried by heating at 150–160° C. for an hour, then filtered through a siliceous filter aid. The oil-soluble, slightly viscous filtrate showed the following analyses:

| | |
|---|---|
| Basic No | 5.8 |
| Sodium _____percent__ | 1.16 |
| Strontium _____do____ | 0.17 |
| Metal ratio | 1.66 |

The unfiltered part of the product was heated for one hour at about 150° C. while carbon dioxide was bubbled into the mixture. The product then was heated further at 150° C. for 30 minutes, and filtered. The filtrate was an oil-soluble, free-flowing liquid having the following analyses:

| | |
|---|---|
| Basic No | 1.3 |
| Sodium _____percent__ | 1.05 |
| Strontium _____do____ | 3.16 |
| Metal ratio | 2.74 |

*Example 24*

A product was prepared as in the preceding example, using as starting materials sodium petroleum sulfonate, p-tert-butyl phenol and strontium hydroxide octahydrate. After this product had been heated to 150° C. it was treated with sulfur dioxide for an hour, then dried by heating at 150–155° C. for another hour, and filtered. The filtrate was an oil-soluble, free-flowing liquid having the following analyses:

| | |
|---|---|
| Basic No | 3.3 |
| Sodium _____percent__ | 1.36 |
| Strontium _____do____ | 3.87 |
| Metal ratio | 2.82 |

*Example 25*

A mixture of 672 grams (1.0 equivalent) of a 60 percent oil solution of sodium petroleum sulfonate, 394 grams (1.0 equivalent) of di-2-ethylhexyl dithiophosphoric acid, 40 grams (1.0 equivalent) of sodium hydroxide, and 375 grams of water was warmed at 40–50° C. for 20 minutes, then treated at 70° C. with 250 grams (1.25 equivalents) of diisobutylphenol, 680 grams (8.9 equivalents) of barium oxide, and 1622 grams of mineral oil. This mixture was heated at reflux temperature for one hour, then freed of water by heating to 150° C. A portion was removed, heated further at 140–160° C. for an hour, then filtered. The oil-soluble, free-flowing filtrate showed the following analyses:

| | |
|---|---|
| Basic No | 46.2 |
| Sodium _____percent__ | 1.27 |
| Barium _____do____ | 9.3 |
| Metal ratio | 3.25 |

The unfiltered portion of the product mixture was treated with carbon dioxide for an hour at 150–155° C., then after an additional 30-minute period of heating at 150° C., it was filtered. The oil-soluble, non-viscous filtrate showed the following analyses:

| | |
|---|---|
| Basic No | 1.65 |
| Sodium _____percent__ | 1.20 |
| Barium _____do____ | 14.9 |
| Metal ratio | 4.46 |

Example 26

To a solution of 197 grams (4.92 equivalents) of sodium hydroxide in 1300 grams of water at 80° C., there was added 1500 grams (2.23 equivalents) of white oil sulfonyl chloride and the mixture was heated at reflux temperature for an hour. Water was removed by azeotropic distillation with toluene and the dried-residue was filtered and the filtrate diluted with 1510 grams of mineral oil and evaporated at 150° C./20 mm. The residual sodium sulfonate was mixed with 390 grams (1.23 equivalents) of cetyl phenol, 610 grams (7.97 equivalents) of barium oxide and 325 grams of water and heated at reflux temperature for one hour, then freed of the water by heating to 150° C. A portion of this product was heated for one hour at 150–160° C., then filtered. The oil-soluble filtrate showed the following analyses:

| | |
|---|---:|
| Basic No. | 21.4 |
| Sodium _____ percent | 0.95 |
| Barium _____ do | 5.65 |
| Metal ratio | 2.59 |

The unfiltered part of the product was treated with carbon dioxide at 150° C. for one hour, then filtered. This filtrate, likewise, was oil-soluble and showed the following analyses:

| | |
|---|---:|
| Basic No. | 2.7 |
| Sodium _____ percent | 0.98 |
| Barium _____ do | 11.3 |
| Metal ratio | 4.42 |

Example 27

A mixture of 600 grams (0.5 equivalent) of a 40 percent oil solution of mixed barium didodecylbenzene sulfonate and barium petroleum sulfonate (sulfate ash content: 10.1%), 523 grams (0.5 equivalent) of a 45 percent oil solution of calcium petroleum sulfonate (sulfate ash content: 6.5%), 93 grams (0.6 equivalent) of o-chlorobenzamide, 135 grams of water, and 654 grams of mineral oil was heated to 50° C. and treated over a 15-minute period with 165 grams (3.93 equivalents) of lithium hydroxide monohydrate. The mixture was heated at reflux temperature for one hour, then freed of water by heating to 150° C. A small sample was removed, dried further by heating at 150° C., and filtered. The filtrate was an oil-soluble, free-flowing liquid, having the following analyses:

| | |
|---|---:|
| Basic No. | 4.95 |
| Barium _____ percent | 1.7 |
| Calcium _____ do | 0.09 |
| Lithium _____ do | 0.52 |
| Metal ratio | 2.02 |

The unfiltered part of the product was treated at 145–155° C. with carbon dioxide for about an hour, dried by 30 minutes heating at 150° C., and filtered. The oil-soluble, free-flowing filtrate showed the following analyses:

| | |
|---|---:|
| Basic No. | 3.1 |
| Barium _____ percent | 1.68 |
| Calcium _____ do | 0.38 |
| Lithium _____ do | 0.88 |
| Metal ratio | 3.41 |

Example 28

A mixture of 332 grams (0.5 equivalent) of a 60 percent oil solution of mixed sodium petroleum sulfonate and sodium polydodecylbenzene sulfonate, 523 grams (0.5 equivalent) of a 45 percent oil solution of calcium petroleum sulfonate (6.5 percent sulfate ash), 124 grams (0.6 equivalent) of diisobutylphenol, 135 grams of water and 649 grams of mineral oil was heated to 50° C. and treated over a period of 30 minutes with 301 grams (3.93 equivalents) of barium oxide. The resulting mixture was heated for one hour at reflux temperature, then dehydrated by heating to 150° C. A portion was removed, dried by continued heating at 150° C. for 30 minutes, and filtered. The oil-soluble filtrate showed the following analyses:

| | |
|---|---:|
| Basic No. | 49.0 |
| Barium _____ percent | 8.84 |
| Calcium _____ do | 0.09 |
| Sodium _____ do | 0.65 |
| Metal ratio | 3.17 |

The unfiltered portion of the product was treated with carbon dioxide for an hour at 150° C., then dried by continued heating at 150° C. for 30 minutes, and filtered. The filtrate was an oil-soluble, free-flowing liquid having the following analyses:

| | |
|---|---:|
| Basic No. | 2.36 |
| Barium _____ percent | 12.5 |
| Calcium _____ do | 0.12 |
| Sodium _____ do | 0.60 |
| Metal ratio | 4.30 |

Example 29

To a mixture of 315 grams of petroleum sulfonic acid (0.5 equivalent) and 336 grams of mineral oil there was added a solution of 33 grams (0.5 equivalent) of potassium hydroxide in 68 grams of water, and then 104 grams (0.5 equivalent) of tetralin sulfonic acid (ratio of equivalents of sulfonic acid to promoter is 1.0). Finally, at 55–95° C., 151 grams (1.97 equivalents) of barium oxide was added portionwise over a period of 10 minutes, and the temperature was maintained thereafter at 95–105° C. for one hour. The temperature then was raised to 150° C., 479 grams of mineral oil added, and a portion of the resulting product removed and dried by heating for one hour at 150–160° C. This sample was filtered, yielding an oil-soluble, free-flowing filtrate which show the following analyses:

| | |
|---|---:|
| Basic No. | 5.4 |
| Potassium _____ percent | 1.51 |
| Barium _____ do | 5.47 |
| Metal ratio | 3.36 |

The balance of the unfiltered product was treated with carbon dioxide at 155° C. for one hour, then filtered. The filtrate was oil-soluble and showed the following analyses:

| | |
|---|---:|
| Basic No. | nil |
| Potassium _____ percent | 1.26 |
| Barium _____ do | 4.65 |
| Metal ratio | 2.88 |

Example 30

A mixture of 315 grams (0.5 equivalent) of petroleum sulfonic acid, 150 grams of water and 283 grams of mineral oil was heated to 70° C. whereupon 21 grams (0.5 equivalent) of lithium hydroxide monohydrate was added and the mixture was heated at reflux temperature for an hour. The temperature was lowered to 70° C. and 171 grams (1.22 equivalents) of strontium hydroxide octahydrate, and 230 grams (2.44 equivalents) of phenol were added. This mixture was heated at reflux temperature for three hours, then freed of water by heating to 150° C. The product was carbonated by treatment with carbon dioxide at 150–160° C. for one hour, then dried by heating to 210° C./10 mm. Filtration through a siliceous filter aid yielded an oil-soluble, free-flowing liquid having the following analyses:

| | |
|---|---:|
| Basic No. | 37.5 |
| Lithium _____ percent | 0.64 |
| Strontium _____ do | 8.1 |
| Metal ratio | 5.76 |

Example 31

A mixture of 282 grams (1.0 equivalent) of oleic acid and 1119 grams of mineral oil was treated at 90° C. with a solution of 42 grams (1.0 equivalent) of lithium hydroxide monohydrate in 300 grams of water and then heated at reflux temperature for one hour. To this mixture, at 80° C., there was added 124 grams (0.6 equivalent) of diisobutylphenol and 302 grams (3.94 equivalents) of barium oxide, and the whole was heated at reflux temperature for two hours. The mass was dehydrated by heating to 150° C., then carbonated by treatment with carbon dioxide at this temperature for about one hour. The resulting product was filtered yielding as a filtrate an oil-soluble, free-flowing liquid having the following analyses:

| | |
|---|---|
| Basic No. | 5.9 |
| Lithium _____percent | 0.28 |
| Barium _____do | 11.2 |
| Metal ratio | 4.24 |

The salt complexes produced in accordance with the present invention can be employed in lubricants including oils and greases, and for such purposes as in crankcases, transmissions, gears, etc. as well as in torque converter oils. Other suitable uses for such complexes are in asphalt emulsions, insecticidal compositions, fire-proofing and stabilizing agents in plasticizers and plastics, paint driers, rust inhibiting compositions, pesticides, foaming compositions, cutting oils, metal-drawing compositions, flushing oils, textile treatment compositions, tanning assistants, metal cleaning compositions, emulsifying agents, antiseptic cleansing compositions, penetrating agents, gum solvent compositions, fat splitting agents, bonding agent for ceramics and asbestos, asphalt improving agents, flotation agents, improving agents for hydrocarbon fuels such as e. g., gasolene and fuel oil, etc.

More particularly, the complexes of this invention are especially adapted for the preparation of lubricants, paint driers and plastics, particularly the halogen bearing plastics. In these respects, the salt complex can be employed in the following concentrations based upon the weight of the total composition.

| | Broad Range, Percent | Usual Range, Percent | Preferred Range, Percent |
|---|---|---|---|
| Lubricant | 0.01-20 | 0.2-15 | 0.5-10 |
| Stabilizing Agent for Plastics | 0.05- 5 | 0.1- 3 | 0.2- 2 |
| Paint Drier | 0.2 -25 | 0.5-20 | 1.0-15 |

For a more detailed description of the utility of the compositions of this invention, reference may be made to applicants' copending application, Serial No. 318,521 now U. S. Patent 2,723,234 at column 36, line 15 through column 45, line 25.

Other modes of applying the principles of the invention may be employed, change being made as regards the details described, provided the features stated in any of the following claims, or the equivalent of such, be employed.

We therefore particularly point out and distinctly claim as our invention:

1. A process which comprises:

I. Preparing and mixing a mass in which, at 50° C., at least 50% of the components are in the liquid state, and in which mass the active components consist of:
  (i) at least one oil-soluble compound selected from the class consisting of:
    (1) acidic organic compounds;
    (2) salts of acidic organic compounds; and
    (3) mixtures of (1) and (2)
  (ii) at least one compound other than those selected as component (i) selected from the class consisting of:
    (1) compounds having the formula AH, in which A is an anionic radical and H is hydrogen, which compounds:
      (a) are water-soluble at a temperature of 50° C. to the extent of at least .0005%; and
      (b) in the presence of water, having an ionization constant greater than about $1 \times 10^{-10}$ at about 25° C., the saturated aqueous solutions of which at about 25° C. have pH values not greater than 7.0;
and which compounds are selected from the class consisting of:
      (a') organic compounds and
      (b') inorganic compounds containing a plurality of atoms of an acid-forming element; and
    (2) the metal salts of the compounds defined by (1) above;
the relative amounts of (i) and (ii) used being in the range of from about one equivalent of (i) to about ten equivalents of (ii) to about ten equivalents of (i) to about one equivalent of (ii);
  (iii) at least one compound other than those selected as components (i) and (ii) selected from the class consisting of:
    (1) metal salts; and
    (2) metal bases;
in an amount such that there are present in the mass a total of substantially more than one equivalent of cationic salt-forming radicals, including those present in components (i) and (ii), per equivalent of (i) and (ii); and
  (iv) at least one material selected from the class consisting of:
    (1) water;
    (2) the water-soluble alcohols and mixtures of such alcohols; and
    (3) mixtures of water and such alcohols
in an amount, inclusive of that in chemical combination with all of the components present, equal to at least one mole per mole of (iii); II. and then maintaining the mass at a temperature and for a period of time sufficient to drive off substantially all free water and alcohol, including water and alcohol of hydration, which may be present, said process being characterized further in that the metals present in the reaction mass include at least two dissimilar metals selected from the class consisting of the metals of Group I having an atomic weight of less than 40 and the metals of Group II having an atomic weight of less than 138, at least one of said metals is selected from group I, and at least one of said metals is selected from group II.

2. The process of claim 1 further characterized in that the process mass is treated prior to filtering with an acidic material of which the ionization constant is higher than the ionization constant of the compounds of component (ii) and in amounts sufficient to liberate a substantial proportion of said organic compound of component (ii).

3. The process of claim 1 further characterized in that the metals present in the reaction mass include barium and sodium.

4. The process of claim 1 further characterized in that the component (ii) is at least one phenol.

5. The process of claim 1 further characterized in that the component (ii) is at least one alkyl phenol.

6. The process of claim 1 further characterized in that the component (ii) is diisobutyl phenol.

7. The process of claim 1 further characterized in that component (i) is at least one sulphonic acid.

8. The process of claim 1 further characterized in that the process mass is treated prior to filtering with $CO_2$ in amounts sufficient to liberate a substantial proportion of said compound of component (ii).

9. The process of claim 1 further characterized in that component (i) comprises at least one alkyl aromatic sulphonic acid and at least one petroleum sulphonic acid.

10. A product in accordance with the process of claim 1.

References Cited in the file of this patent

UNITED STATES PATENTS

| | | |
|---|---|---|
| 2,417,429 | McLennan | Mar. 18, 1947 |
| 2,418,894 | McNab et al. | Apr. 15, 1947 |
| 2,595,557 | Worth et al. | May 6, 1952 |
| 2,610,946 | Eckert | Sept. 1, 1952 |
| 2,616,905 | Asseff et al. | Nov. 4, 1952 |
| 2,616,906 | Asseff et al. | Nov. 4, 1952 |
| 2,616,911 | Asseff et al. | Nov. 4, 1952 |
| 2,616,924 | Asseff et al. | Nov. 4, 1952 |
| 2,616,925 | Asseff et al. | Nov. 4, 1952 |